United States Patent Office 3,380,882
Patented Apr. 30, 1968

3,380,882
NOVEL RUBBER COATING COMPOSITION
Jackson S. Boyer, Northridge, Del., and Ralph Zaayenga, West Chester, Pa., assignors to Sun Oil Company, Philadelphia, Pa., a corporation of New Jersey
No Drawing. Filed Aug. 17, 1964, Ser. No. 390,182
7 Claims. (Cl. 161—234)

This invention relates to coating formed rubber articles. More particularly, this invention relates to a method of coating vulcanized natural and synthetic rubber articles for the purpose, among others, of providing a protective surface covering thereon to prevent or inhibit degradation of such materials in the presence of ozone and oxygen.

Recent advances in rubber technology are contributing to the development of long-life automobile and truck tires. Primarily these advances have been made in the development of abrasive-resistant treads which theoretically double the mileage life of a tire. However, although the abrasive-resistance properties of tire treads have been substantially improved, the inherent susceptibility of elastomers to breakdown due to ozone- and oxygen-initiated degradation remains an ever-present weakness which is a primary limiting factor in the life of an automobile or truck tire. It has been reported by H. A. Winkelman in Industrial and Engineering Chemistry, Volume 44, No. 4, pp. 841–850, that deterioration of rubber products outdoors due to the action of sunlight and ozone is a problem of major concern to all manufacturers and consumers of rubber products. Automotive manufacturers each year face losses aggregating into thousands of dollars because of premature cracking and failure of rubber parts.

Many organic antioxidants such as N-isopropyl-N'-phenyl-p-phenylene diamine, N-phenyl-N'-cyclohexyl-p-phenylene diamine, 6-ethoxy-1,2-dihydro-2,2,4-trimethyl quinoline, N,N'-di-(1-methylheptyl) - p - phenylene diamine, and diphenyl-p-phenylene diamine homologs are added to rubber compounds prior to molding and vulcanization to inhibit oxidation and the detrimental effects of ozone during the life of the rubber article. However, none of the antioxidant additives has been found to be entirely effective.

Degradation from ozone and oxygen primarily takes place on the surface of the rubber article where the most frequent contact with the degradation initiators is realized. Dispersing of antioxidants throughout the rubber article does not provide protection where it is most urgently needed, namely, on the surface of the molded article.

It is, therefore, an object of this invention to provide a method for protecting the surfaces of vulcanized molded rubber articles by coating the articles with a hydrocarbon wax-crystalline polypropylene blend.

It is further an object of this invention to provide a rubber composition having improved resistance to degradation caused by exposure to oxygen and ozone.

Other objects of this invention will appear from the following detailed description.

In accordance with the present invention, it has been discovered that formed rubber articles can be endowed with improved oxidation- and ozone-degradation resistance by coating the vulcanized rubber article with a blend containing 5 to 70 percent hydrocarbon wax and 30 to 95 percent substantially crystalline polypropylene. When a molded rubber article is coated with a thin layer of wax-polypropylene blend and subsequently subjected to heat such as in a vulcanization process, it has been found that the wax-polypropylene blend fuses to the surface of the molded rubber article and thereby imparts a protective coating to the surface of the molded rubber article which is effective in inhibiting ozone and oxygen degradation.

Polypropylene used in the present invention is a high molecular weight substantially crystalline polypropylene having a melting point in the range of 300 to 340° F. (ASTM D2117–62T), a density in the range of 0.86 to 0.91, a molecular weight in the range of 50,000 to 500,000 (Harris correlation, J. Polymer Science, 8, 361 (1952) and a crystallinity of 4 to 95% preferably 60 to 90%). This material as is well known can be prepared by polymerizing propylene at or near atmospheric pressure with the aid of a coordinated complex catalyst, e.g., as described in Belgian Patent 538,782.

In the process of the present invention the wax-polypropylene coating may be applied by dipping or spraying the formed rubber article with a molten blend of the coating composition, or formed rubber articles such as automobile or truck tires may be wrapped in a preformed thermoplastic film of the coating blend. In either process the coated article is subsequently exposed to treatments such as exposure to superheated steam or a heated mold or other means known to the art which are normally associated with methods of vulcanizing rubber which are well known to those skilled in the art.

The wax-polypropylene coating composition may be pigmented to provide a colored coating. Pigments such as titanium dioxide which is used to impart a white appearance or carbon black which imparts a black appearance and many others which are well known to those skilled in the art may be incorporated into the wax-polypropylene coating blend by any of the following methods.

A wax-polymer blend is pigmented by first preparing a colored wax concentrate by thoroughly working the desired pigment into the molten wax in suitable equipment such as on ink rolls or in a Banbury mixer. In this method of preparing a concentrate, the ratio of wax to pigment should be chosen so that upon dilution of the concentrate with unpigmented polypropylene the final composition has the desired proportion of the three ingredients. After the pigment is uniformly dispersed in the wax, the mixing with the crystalline polypropylene can be carried out by flaking the pigmented wax and blending said mix with the polypropylene powder or by the various methods disclosed in United States Patent No. 3,030,322 to R. J. Schrader or United States Patent No. 2,512,459 to George Erving Hamilton.

The process of coating formed vulcanized rubber articles by a dip-coating procedure is performed in the following manner. A coating composition containing 5 to 70 parts mineral wax, 95 to 30 parts crystalline polypropylene and 0.1 to 10 parts of a color-producing pigment is prepared according to the above-described procedure. The term "parts" as used herein is used to mean "parts by weight."

The wax-polymer blend is maintained at a temperature between 325° F. and 450° F. in an open-heated mixing vessel. The formed rubber object is immersed in the molten coating blend for 10 to 60 seconds, withdrawn and permitted to cool. The coated rubber article is then subjected to vulcanization, a process previously described in order to complete the coating procedure.

Another method of coating formed vulcanized rubber articles comprising wrapping the article to be coated in a 0.5 to 3 mil film (i.e., .0005 to .003 inch) consisting of a blend of 5 to 70 parts mineral wax, 95 to 30 parts crystalline polypropylene and 0.1 to 10 parts of a color-producing pigment, and said film being made by methods well known to one skilled in the art. Films used for coating may also be supported by paper backing which films are described as laminate sheets. This type of film is especially useful for coating rubber tires which are vulcanized in heated metal molds. The paper backing serves as a separation medium between the coating and the surface of the metal mold. This method of coating results in a cleaner mold after vulcanization. The paper backing is easily removed from the tire after the vulcanization procedure resulting in a uniformly coated vulcanized rubber tire. The coating film having the paper backing herein described may be of the same composition and dimensions disclosed above. The paper backing may be selected from rope paper or kraft paper, or any paper suitable for coating.

As a specific embodiment of the present invention the following example is cited.

Fifty parts of paraffin wax havin ga melting point of 126° F. (ASTM D87), a penetration of 18 at 77° F., and a S.U.S. viscosity at 210° F. of 39 (ASTM D1321) which wax may be prepared according to the processes disclosed in United States Patent 2,906,443 is blended with fifty parts of crystalline polypropylene, prepared according to Belgian Patent 538,782, having a melting point of 327° F., a density of 0.91 gram per cubic centimeter and a flow rate of 1.0 gram per ten minutes by ASTM D1238-62T test procedure.

The foregoing wax-polypropylene blend is extrusion coated with standard extrusion coating equipment by standard methods known to one skilled in the art at an extrusion temperature of 425° F. to an average thickness of .0005 inch (0.5 mil) onto an unbleached kraft paper. The kraft paper backed coating film is subsequently contacted with a flat unvulcanized sheet of styrene-butadiene rubber with the polymer-wax film directly contacting the surface of the rubber. The rubber sample is then heated in a vulcanizing mold at 288° F. for thirty minutes. The rubber sample is recovered from the mold and the paper backing is easily removed leaving a uniformly coated rubber sample with none of the wax-polypropylene blend adhering to the paper but firmly bonded to the rubber sample. From this coated rubber sample, ten one-inch tensile bar specimens as described in ASTM D1708-59T are cut and tested for resistance to ozone degradation by the "Vanderbilt Ozone Test." In general the Vanderbilt test consists of subjecting elongated rubber samples (which are elongated between 0 and 100% in increments of 10%) to prolonged exposure to a controlled ozone-contaminated atmosphere at an elevated temperature. The effectiveness of protection against ozone degradation is determined by the maximum degree of elongation at which the sample does not break according to the Vanderbilt method. The samples of the present coated rubber specimens were exposed to an atmosphere contaiing 50 parts per hundred million of ozone, at 100° F. for 100 hours as specified in ASTM D1149-60T which is a standard ozone weathering test for rubber products.

The herein described coated rubber samples were visibly unaffected by ozone exposure and had no failures or breaks. Samples of the same rubber uncoated and tested in the identical manner had total failures above 60 percent elongation and severe cracking below 60 percent elongation. A comparison of the test results of the coated and uncoated rubber samples described above amply demonstrates the improved ozone degradation resistance of vulcanized rubber articles coated by the process of the present invention.

Crystalline polypropylene has been found to be the only thermoplastic polymer effective in the process of the present invention. It is believed that the polymer component of the wax-polymer coating composition of the present invention must have the inherent properties of softening but not melting when subjected to rubber vulcanization conditions. Also the polymer must be compatible with hydrocarbon waxes. Waxes useable in the present invention must be compatible with hydrocarbon polymers and diffusible therein. Petroleum waxes such as paraffin wax and microcrysatlline wax were found to fill these specifications. It has been discovered that the unique combination of petroleum wax and crystalline polypropylene provides an effective coating to protect the surfaces of vulcanized rubber articles. The above-described coatings were found to be effective in a thickness range of .0001 to .005 inch, however the preferred range is .0005 to .003 inch. The waxes and the crystalline polypropylene used in the present invention can contain conventional wax or polymer improving additives such as thermal and ultraviolet stabilizers without deviating from the spirit and scope of this invention.

Other advantages that may be gained by the practice of the present invention include: a method for providing a more abrasive resistant surface to molded rubber articles; a method of surface pigmenting molded rubber articles which eliminates excessive mold clean up when colors are changed and also reduces the quantities of costly pigment used in coloring rubber articles and finally a means for eliminating the need for coating tire vulcanizing molds with mold-release agents by covering a tire with the paper backed laminate herein described prior to vulcanization. These and other advantages will be readily recognized in the practice of the present invention.

We claim:

1. An article of manufacture comprising a vulcanized rubber article excluding neoprene having fused thereto a thin surface coating consisting essentially of 5 to 70 parts of hydrocarbon wax melting in the range of 100 to 165° F. and 30 to 95 parts of crystalline polypropylene melting in the range of 300 to 340° F. and having a density in the range of 0.86 to 0.91 gram per cubic centimeter.

2. An article according to claim 1 wherein said coating has a thickness in the range of .0005 to .003 inch.

3. An article according to claim 1 wherein said coating contains .01 to 10 parts of a pigment.

4. A method of preparing a vulcanized rubber article excluding neoprene resistant to degradation by ozone and oxygen which comprises applying to the surface of a formed rubber article prior to vulcanization a thin surface coating consisting essentially of 5 to 70 parts of hydrocarbon wax melting in the range of 100 to 165° F. and 30 to 95 parts of crystalline polypropylene melting in the range of 300 to 340° F. and having a density in the range of 0.86 to 0.91 gram per cubic centimeter and thereafter vulcanizing the coated rubber article.

5. A method according to claim 4 wherein the thickness of said coating is in the range of .0005 to .003 inch.

6. A method according to claim 4 wherein said coating contains .01 to 10 parts of a pigment.

7. A method of preparing a vulcanized rubber article resistant to degradation by ozone and oxygen which comprises
   (a) forming a laminate sheet comprising a paper backing and a thin film comprising 5 to 70 parts of a hydrocarbon wax melting in the range of 100 to 165° F. and 30 to 95 parts of crystalline polypropylene melting in the range of 300 to 340° F. and having a density in the range of 0.86 to 0.91 gram per cubic centimeter;
   (b) applying the laminate sheet to the surface of a pre-formed unvulcanized rubber article with said film being adjacent said surface;
   (c) vulcanizing said rubber article with the laminate film thereon; and
   (d) removing said paper backing from the rubber article after vulcanization, whereby a vulcanized rubber article is obtained having a hydrocarbon wax-polypropylene coating fused thereto.

References Cited

UNITED STATES PATENTS

| | | | |
|---|---|---|---|
| 2,649,134 | 8/1953 | Steinle | 161—252 X |
| 2,685,904 | 8/1954 | Brandon | 156—116 X |
| 2,711,985 | 6/1955 | Olson | 161—253 X |
| 2,728,735 | 12/1955 | Anderson | 161—234 X |
| 2,968,627 | 1/1961 | Bowers | 117—139 |
| 2,974,113 | 3/1961 | Dunkel | 117—139 X |
| 3,264,168 | 8/1966 | Sheary | 161—253 X |

OTHER REFERENCES

"The Neoprenes," Murray, R. M.; Thompson, D.C.: DuPont deNemours and Co., Wilmington, Del., 1963 pages 29, 30, 59.

"Polypropylene," Kresser, O. J.: Reinhold Publishing Corp., New York 1960, pages 39, 40, 42, 43.

EARL M. BERGERT, *Primary Examiner.*

CLIFTON B. COSBY, *Examiner.*